Dec. 8, 1925.  
T. M. ALLEN  
1,564,188  
PEDAL FOR BICYCLES, MOTOR CYCLES, AND THE LIKE  
Filed Nov. 8, 1923    2 Sheets-Sheet 1

Inventor  
Thomas M. Allen  
By Sturtevant Mason  
Attorneys

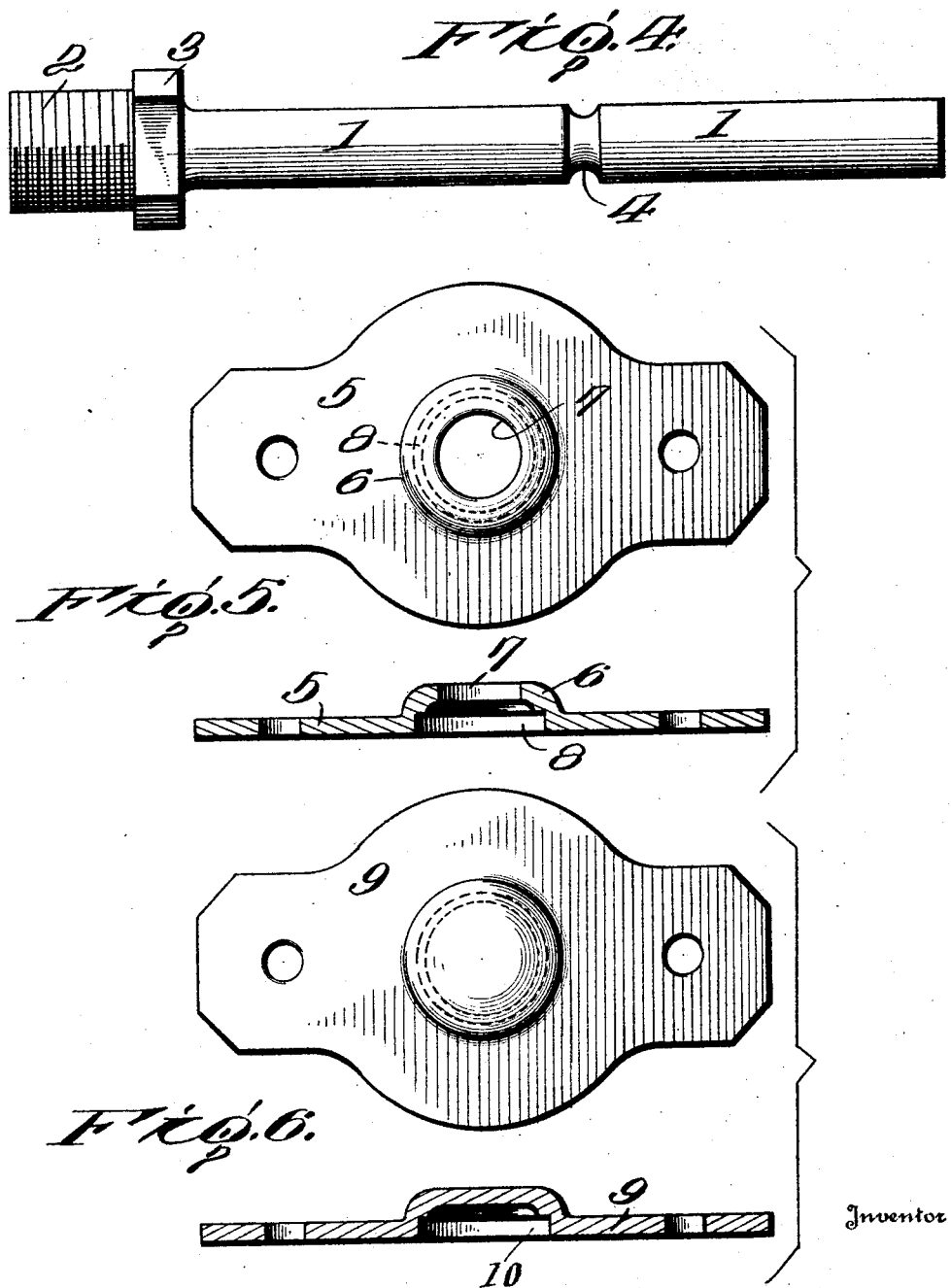

Patented Dec. 8, 1925.

1,564,188

UNITED STATES PATENT OFFICE.

THOMAS M. ALLEN, OF TORRINGTON, CONNECTICUT, ASSIGNOR TO THE TORRINGTON COMPANY, OF TORRINGTON, CONNECTICUT, A CORPORATION OF CONNECTICUT.

PEDAL FOR BICYCLES, MOTOR CYCLES, AND THE LIKE.

Application filed November 8, 1923. Serial No. 673,502.

*To all whom it may concern:*

Be it known that I, THOMAS M. ALLEN, a citizen of the United States, residing at Torrington, in the county of Litchfield, State of Connecticut, have invented certain new and useful Improvements in Pedals for Bicycles, Motor Cycles, and the like, of which the following is a description, reference being had to the accompanying drawing and to the figures of reference marked thereon.

The invention relates to pedals for bicycles, motor cycles and the like.

The objects of the invention are to provide a pedal in which the pedal frame is balanced in center by a single ball bearing and so doing away with the adjustments necessary with pedals having ball bearings at both ends; to provide a pedal which can be readily assembled at low cost by reason of such single central ball bearing; to provide a pedal formed of an axle pedal pin or spindle having a central raceway, a hub or sleeve in two sections with abutting raceways at their inner ends and held at their outer ends in cup-like seats formed in two parallel end plates assembled and secured together by the rods carrying the pedal rubbers; to lessen the number of balls and other parts commonly employed in pedals; to provide a pin formed from a straight bar upset on one end to afford the diameter to allow shoulder and threading size at that end, the opposite end requiring no threading; to provide a pedal wherein the end plates are cupped to allow clamping space for the ends of the divided two-part sleeve, and finally to provide a construction with a single central bearing for any size pedal.

These objects I accomplish by the construction shown in the accompanying drawing, in which Figure 1 is a sectional plan of the improved pedal;

Fig. 4 is a plan of the pin;

Fig. 5 shows the inner end plat in elevation and section; and

Fig. 6 is a like view of the outer end plate.

Figure 1:
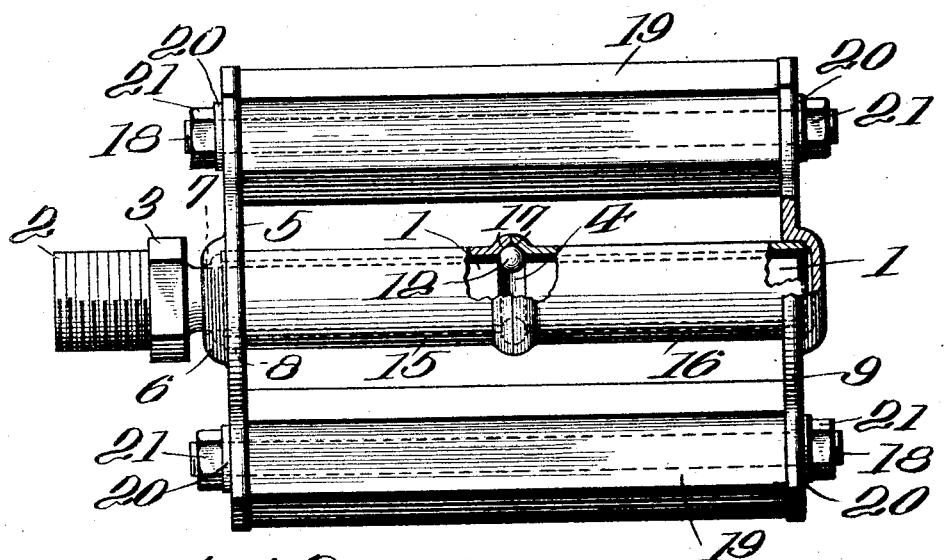
Figure 2:
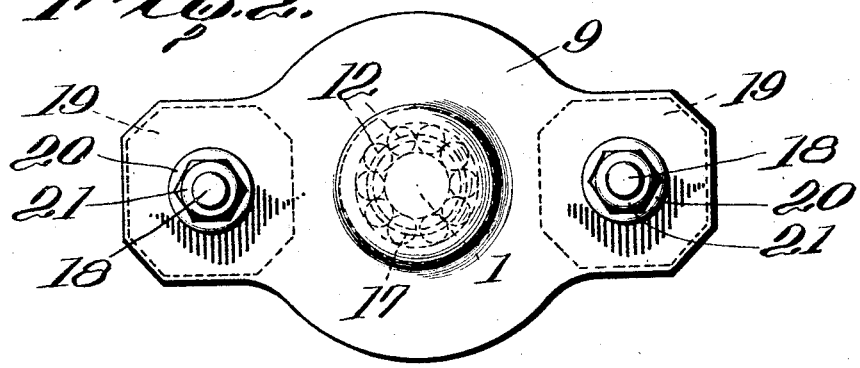
Fig. 2 is an end elevation thereof.
Figure 3:
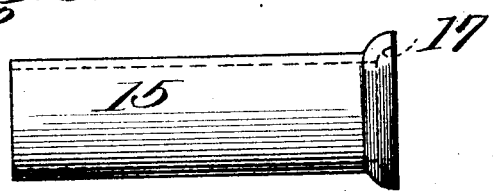
Fig. 3 is a side elevation of one of the sleeve members.

The pin 1 is formed from a straight bar upset at its inner end to form an enlargement which is threaded to form the attaching screw 2 and the nut shaped shoulder 3; the opposite end being unthreaded and the middle portion formed with an annular groove forming the inner half 4 of the ball race. The inner end plate 5 has an integral dust cap 6 formed between the ends; said dust cap is provided with a central aperture 7 to receive the pin 1 and around the inner edge of the dust cap 6 is formed an annular recess or seat 8, in which fits the inner end of the inner sleeve member 15. The outer sleeve member 16 fits upon the outer half of the pin 1 and the inner abutting ends of these sleeve members 15—16 are provided with race forming annular groove 17 which register with the race forming groove 4 of the pin. The outer end plate 9 is the counter part of the inner end plate 5 except that the pin aperture is omitted, in that the outer end of the pin is covered thereby since no nut is required on the said outer end. The seat 10 for the outer end of the outer sleeve member 16 is the same as the seat or recess 8.

The inner plate 5 is first slipped over the pin 1, then the inner sleeve member 15, and the balls 12 are placed in the raceway and then the sleeve member 16 is slipped on and the raceway will complete the enclosure of the balls. The outer plate 9 is now slipped upon the pin and the two end plates are secured together at their ends by parallel treads of any desired kind. No adjustment is required for this single central ball bearing construction as the securing together of the end plates 5 and 9 by the tread members holds the sleeve members and the balls in proper assembled relation; the balls holding the whole in place on the pin.

I have shown the pedal members as comprising parallel bolts 18—18, carrying rubber foot pieces 19, and having washers 20 and nuts 21 on their outer ends, thus, as herein shown, securing the parts removably and adjustably together.

It will be seen that I have produced an exceedingly simple pedal of few parts which may be readily assembled by unskilled labor, and one in which adjustment of the ball bearings, usually necessary, is wholly avoided.

Having thus described my invention, what I claim as new and desire to secure by Letters Patent, is:

1. A pedal comprising a pin having an annular groove between its ends, a transversely divided sleeve provided at the abutting ends of its members with annular grooves registering with the pin groove, balls held in the grooves, end plates engaging the outer ends of the sleeve members, and tread members holding the end plates and sleeve members together; the balls in turn holding the sleeve in place upon the axle.

2. A pedal comprising a pin, a two part sleeve mounted on the pin, a single series of balls at the juncture of the inner abutting ends of the sleeve members and interlocking the sleeve and pin, an inner end plate mounted on the pin and engaging the inner sleeve member, an outer end plate engaging the outer sleeve member and enclosing the outer end of the pin, and tread members securing the end plates and sleeve members together.

3. A pedal comprising a pin, a two part sleeve mounted on the pin, a raceway formed by a groove in the pin and abutting ends of the sleeve members, balls within said raceway, an inner end plate apertured for the pin and having an annular seat for the inner end of the inner sleeve member, an outer end plate having a dust cap enclosing the outer end of the pin, and an annular seat receiving the outer end of the outer sleeve member, and tread members rigidly connecting the opposite ends of the end plates.

4. A pedal frame comprising a transversely divided sleeve having annular grooves in the abutting ends of the two members, an inner centrally apertured end plate provided with an annular groove receiving the adjacent end of the inner sleeve member, an outer end plate formed with a closed dust cap, and an inner annular groove receiving the adjacent end of the outer sleeve member, and treads connecting the opposite ends of the end plates.

In testimony whereof, I affix my signature.

THOMAS M. ALLEN.